Feb. 20, 1968   D. R. CICHY ET AL   3,369,781
AIRCRAFT FLIGHT CONTROL SYSTEM
Filed Dec. 12, 1966   2 Sheets-Sheet 1
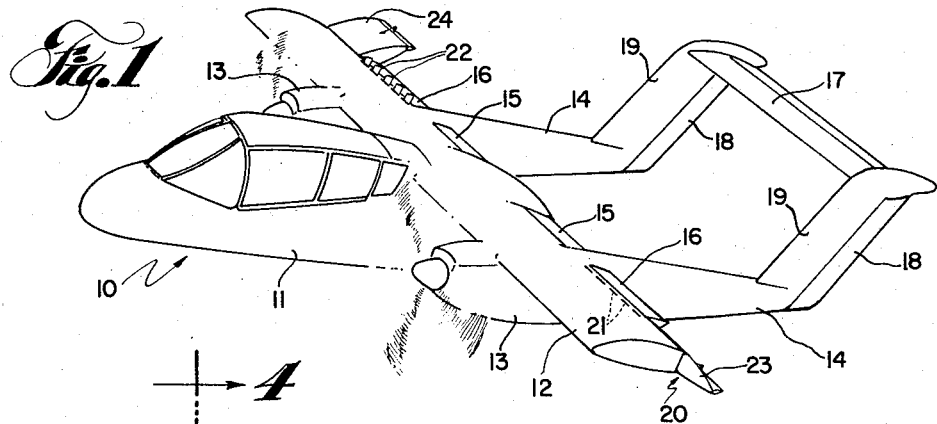
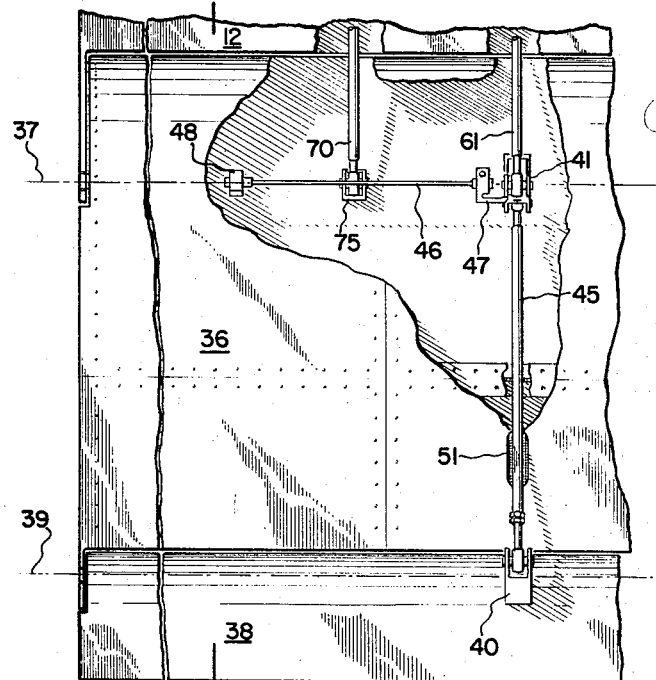
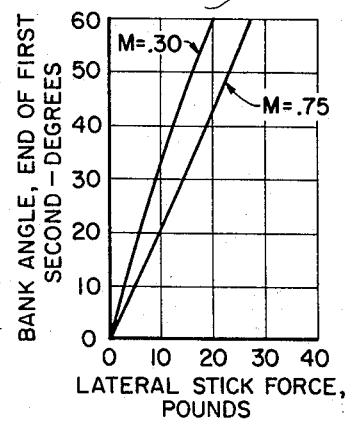
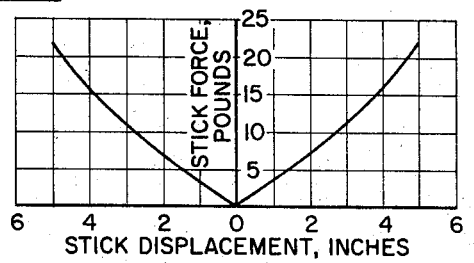
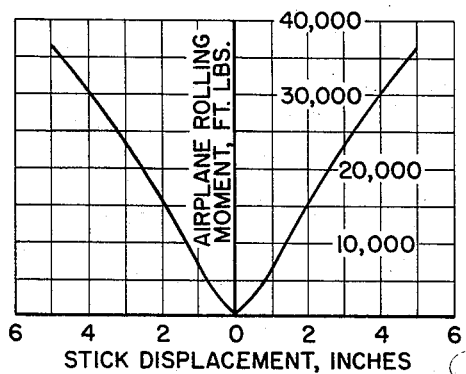
INVENTORS
DANIEL R. CICHY
JAMES L. DENNISTON
JAMES K. L. MAC KAY
BY
ATTORNEY

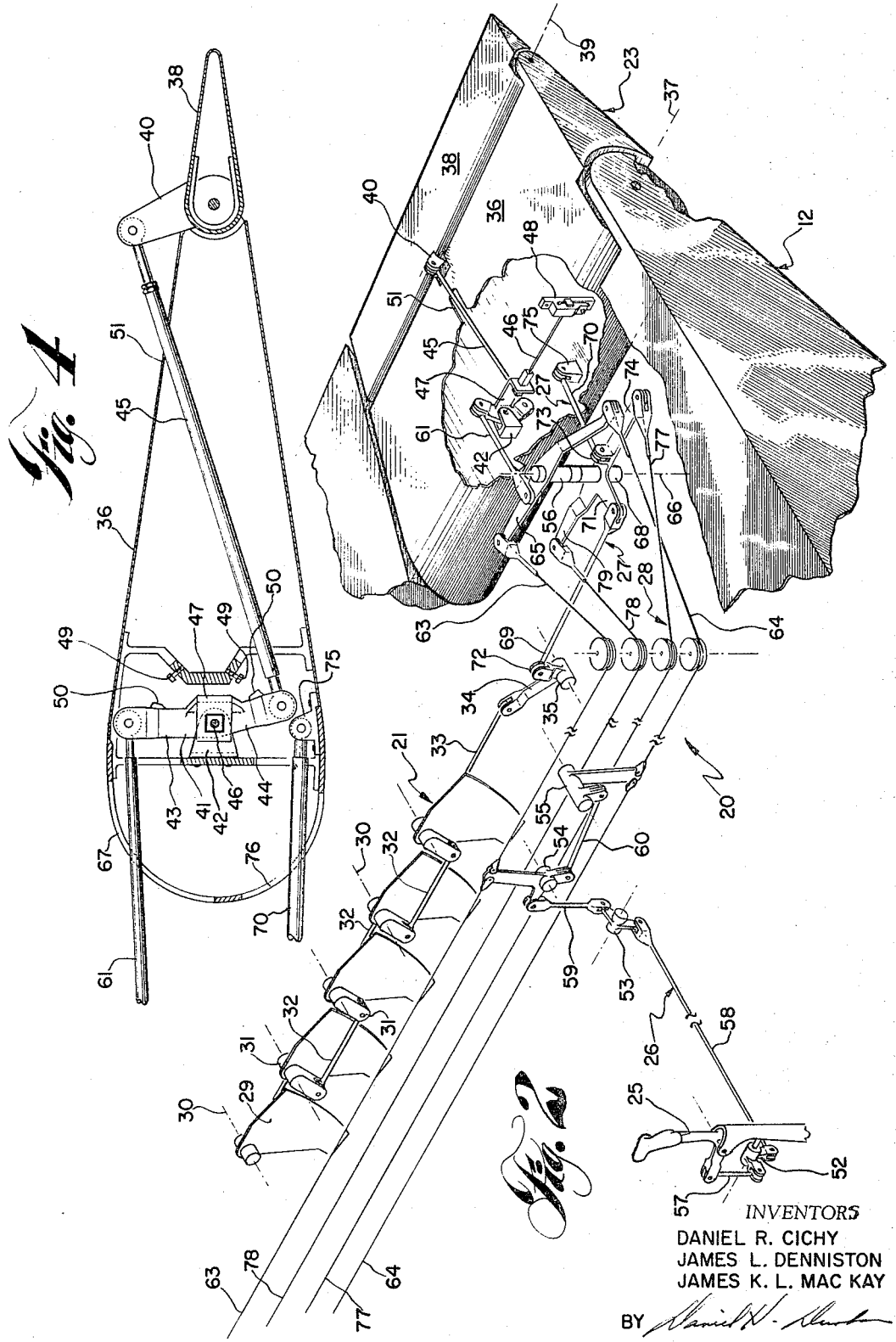

United States Patent Office 3,369,781
Patented Feb. 20, 1968

3,369,781
AIRCRAFT FLIGHT CONTROL SYSTEM
Daniel R. Cichy, Reynoldsburg, and James L. Denniston and James K. L. MacKay, Columbus, Ohio, assignors to North American Rockwell Corporation, a corporation of Delaware
Filed Dec. 12, 1966, Ser. No. 600,828
2 Claims. (Cl. 244—90)

ABSTRACT OF THE DISCLOSURE

Aircraft apparatus utilizing fully manually powered aileron tab devices to control the simultaneous coordinated operation of opposed bi-directionally movable aileron surface assemblies combined with opposed bi-directionally movable spoiler surface assemblies in an aircraft wing installation. Such apparatus is normally operated to control the roll attitude of the incorporating aircraft during flight.

Summary

The aircraft flight control system particularly utilizes a control input means, often in the form of a conventional aircraft control stick, that is manually movable in alternate opposite directions relative to a neutral condition associated with laterally stabilized flight to thereby effect a change in aircraft roll attitude. The pilot-sourced forces applied to the input means are transmitted to and fully power movement of an aileron tab device included in an essentially conventional aileron surface assembly, such device being hingedly carried in the aileron surface assembly by an included aileron surface. Bi-directionally movable spoiler surface assemblies comprised of ganged spoiler surfaces positioned transverse to and rotated about the aircraft longitudinal axis, and contained within the aircraft wing mold lines during laterally stabilized flight, are connected to and driven by the aricraft aileron surface assemblies. By proper coordination the aileron surface assemblies power the spoiler surface assemblies to obtain increased aircraft roll rates throughout a comparatively wide range of flight environment aerodynamic loadings without requiring power boost devices in the system apart from the control input means.

Drawing description

FIG. 1 is a perspective view of an airplane incorporating a preferred embodiment of the aircraft flight control system of this invention;

FIG. 2 is a schematic perspective view of a portion of the aircraft flight control system incorporated in the airplane of FIG. 1 showing the basic elements utilized in the construction of our invention in their functional relationship to each other;

FIG. 3 is a partial plan view of the aileron assembly incorporated in the arrangement of FIGS. 1 and 2;

FIG. 4 is a sectional view taken at line 4—4 of FIG. 3;

FIGS. 5 through 7 graphically illustrate desired lateral flight control system performance characteristics that may be obtained by the practice of this invention.

Detailed description

FIG. 1 illustrates an airplane 10 that incorporates a preferred embodiment of our invention. Such airplane includes a fuselage portion 11 and attached wing 12. Engine nacelles 13 are carried in symmetrically-opposed relation at the underside of wing 12 and are each aerodynamically faired into a rearwardly-extending boom portion designated 14. Nacelles 13 house the aircraft's engines (not shown); conventional propeller assemblies are driven by the engines and preferably in counter-rotating relation. Inboard slotted flap members 15 and outboard slotted flap members 16 are provided in wing 12 for improving the lift capabilities of airplane 10 in short-distance take-off and landing modes of aircraft operation. Horizontal elevator 17 effects longitudinal attitude stability (and pitch control) during flight. Rudders 18 are incorporated in the vertical stabilizers 19 of airplane 10 and are utilized to effect directional control during flight. The aircraft flight control system of our invention is referenced generally in FIG. 1 as 20 and is basically comprised of: opposed spoiler surface assemblies (21, 22), opposed aileron surface assemblies (23, 24) joined to the spoiler surface assemblies, a manually operated control input means (25, FIG. 2), and drive linkage means (26, 27, and 28, FIG. 2) that connects the preceding elements of the system together in a novel coordinated manner and that functions to transmit manual forces from the control input means to the various aileron and spoiler assemblies.

Flight control system 20 includes a left hand installation and a right hand installation mounted in the outboard regions of wing 12 in symmetrically-opposite locations. To simplify the description of this invention, details are provided in the additional figures essentially only as to one of the outboard installations. More particularly, the right hand (relative to the direction of flight) installation essentially corresponds to the left hand installation detailed in FIGS. 2 through 4 except that when it is operated with the left hand installation its components are moved in an opposite sense. As noted in FIG. 1, the complete flight control system specifically includes left hand and right hand spoiler surface assemblies 21 and 22 and left hand and right hand aileron surface assemblies 23 and 24. The control input means of the system normally has the form of a pilot-operated control stick (25, FIG. 2); the drive linkage that mechanically couples the elements of the system is comprised of a linkage 26 connecting control stick 25 to aileron surface assemblies 23 and 24, a pair of linkages 27 connecting each aileron surface assembly to an adjacent spoiler surface assembly 21 or 22, and a linkage 28 serving to couple aileron surface assemblies 23 and 24 to each other to prevent independent up-float during flight.

As shown in the drawings, spoiler surface assembly 21 (and 22) is comprised of a ganged series of individual spoiler plate members 29, each arranged for rotational movement about a separate axis 30 that is oriented generally parallel to the aircraft principal longitudinal axis and direction of flight. Spindle members 31 are connected to (or made integral with) the individual spoiler plate members 29 and provide the necessary lever arms for plate member actuation. Connecting rods 32 are provided to couple the spoiler plate members 29 in each spoiler assembly for simultaneous movement relative to axes 30. Actuation of spoiler assembly 21 (and 22) is accomplished through the interconnecting rod 33 that extends from arm 34 of bellcrank 35 to the spindle member 31 of the first plate member 29 in the ganged series. A more complete description of the construction and operation of a spoiler assembly such as assembly 21 may be obtained from the description of pending application for U.S. Letters Patent Ser. No. 549,755, now Patent No. 3,318,555, May 9, 1967, assigned to the assignee of this invention.

Aileron surface assembly 23 is comprised of a conventional aileron control surface 36 that is hingedly attached to wing 12 along axis 37. Assembly 23 also includes an aileron tab device 38 that is hingedly connected to and carried by aileron surface 36 along axis 39. Tab device 38 is provided with the upwardly projecting tab operating arm designated 40. Also included in assembly 23 is a bellcrank member 41 rotatably carried by the bracket 42 attached to structure of aileron surface 36. Bellcrank 41 rotates in bracket 42 about an axis aligned with axis 37. Arm 43 of bellcrank 41 receives the manual input force for effecting operation of tab device 38. Such force is transmitted to tab element 38 from the other arm 44 of bellcrank 41 through connecting rod 45.

Assembly 23 is also provided with a torsion spring 46 that is secured at one extreme to bracket 48 also attached to structural portions of aileron control surface 36. The opposite extreme of spring 46 is secured to the lateral projection 47 carried by bellcrank 41. Torsion spring 46, preferably having a comparatively low spring constant, serves to proportion positive force gradients to the flight control system at all times. Also included in assembly 23 are the stops 49 that are attached to aileron surface structure and that cooperate with the stop surfaces 50 mounted on bellcrank 42. An opening 51 is provided in the exterior of member 36 to permit rod 45 to extend from the interior to the exterior position of its attachment to operating arm 40. It should be noted that rotation of bellcrank 43 about axis 37 and within the limits established by stops 49 results in a significant reduction of the manual force otherwise required to be imparted to aileron surface member 36. However, when a stop surface 50 is engaged with a stop 49, reaction forces associated with aerodynamic loadings on the aileron surface member will, without compensating rotation of tab 38, be transmitted to arm 43 in feedback relation.

Linkage 26 serves to connect control stick 25 to aileron surface assembly 23 (and 24) and is comprised of bellcranks 52 through 56, push-pull rod members 57 through 61, and the cable-pulley combinations designated 63 and 64. Forces transmitted through cables 63 and 64 are transmitted through arm 65 of bellcrank 56 to assembly 23 by means of rod 61 extending to bellcrank arm 43. An opening 67 is provided in aileron surface 36 to allow rod 61 to reach the interior position of the end of bellcrank arm 43 without obstruction.

Linkage 27 is comprised of a bellcrank 68 and push-pull rods 69 and 70. Rod 69 extends from arm 71 of bellcrank 68 to arm 72 of bellcrank 35; rod 70 extends from projection 73 on arm 74 of bellcrank 68 to the operating arm 75 located interiorly of, and attached to, the structure of aileron surface member 36. Opening 76 is provided in member 36 for the purpose of eliminating structural interference with push-pull rod 70. It should be noted that although bellcranks 56 and 68 are aligned along the same axis 66, such bellcrank members operate entirely independently of each other.

Linkage 28 is comprised essentially of cross-connecting cables 77 and 78. Cable 77 is coupled to arm 74 of bellcrank 68; an arm 79 is provided on bellcrank 68 for attaching cable 78.

In normal operation of the disclosed aircraft flight control system, manual forces applied to stick 25 are transmitted through linkage 26 to aileron spring tab 38 depending upon the nature of the force in rod 61 (compression or tension). Tab 38 is rotated either clockwise or counter-clockwise relative to its FIG. 4 position of laterally stabilized flight and relative to aileron control surface 36. Both clockwise and counter-clockwise rotation of tab 38 relative to control surface 36 cause newly-imposed aerodynamic loading changes to result in correlated rotation of aileron surface 36 about axis 37 to increase and decrease the aerodynamic lift on opposite wing outboard regions. Spoiler assemblies 21 and 22 are driven by linkages 27 in response to rotation of aileron surfaces 36 about axis 37; spoiler assemblies 21 and 22 are not, within the limits of movement defined by stops 49, connected to control stick 25 in a force feedback relation.

Synchronous movement as between opposed aileron assemblies 23 and 24 is achieved by the cross-over linkage system designated 28. It prevents up-float or differential action of the ailerons due to differential aerodynamic loadings. Normally, only one torsion spring 46 is required in the system to provide the necessary positive force gradients and a control system centering capability. The drawings do not disclose means normally incorporated in lateral flight control systems for effecting variable trim inasmuch as such are considered conventional in relation to the present invention.

FIGS. 5 through 7 disclose performance characteristics that have been achieved in an aircraft flight control system having the features of the instant invention. Such information has been developed with respect to a medium-performance aircraft having a normal take-off gross weight of approximately 7500 pounds and based on a weight empty of approximately 5500 pounds. The aircraft is powered by two conventional turbo-prop engines developing a total rated output of 1320 shaft horsepower. As shown by FIG. 5, for aircraft performance at comparatively low aerodynamic loading airspeeds corresponding to Mach 0.3, lateral stick force is restricted to a maximum of 20 pounds to achieve bank angles (at end of the first second from start) of up to 60° and with desired linearity. Increasing the aircraft operational speed to a high aerodynamic loading airspeed value of Mach 0.75 results in a slightly changed performance schedule and with the 20 pound stick force not being exceeded for corresponding bank angles up to 40°. FIG. 6 indicates the stick displacement-stick input schedules which may be realized in the referenced airplane by this invention and for an aircraft operational speed of 173 knots at 7500 feet altitude. The linearity of the schedules is considered to be essentially as ideally desired. FIG. 7 relates to similar operating conditions for the same discussed aircraft and indicates the magnitude of airplane rolling moments that may be achieved as a function of stick displacement. Such moments are indicative of the magnitude of aerodynamic loadings imposed upon the novel flight control system; the inventive approach is at least in part responsible for achieving the linearity (and low level) of the reaction forces transmitted into the lateral flight control system in feedback relation to control stick 25.

It is to be understood that the forms of the invention herewith shown and described are to be taken as preferred embodiments of the same, but that various changes in the proportioning, size, and detail of parts may be resorted to without departing from the spirit of the invention or the scope of the subjoined claims.

We claim:

1. An aircraft flight control system operable to change the roll attitude of an aircraft wing during flight, and comprising:

(a) Manually powered control input means movable bi-directionally with respect to a neutral position associated with laterally stabilized flight, (b) Aileron assembly means having an aileron surface member and a cooperating tab member in each wing outboard region and movable bi-directionally with respect to a neutral position to obtain changes in wing roll attitude when actuated, (c) Spoiler assembly means in each aircraft wing outboard regions and movable bi-directionally with respect to a neutral position to obtain changes in aircraft wing roll attitude when actuated, and (d) Linkage means connecting said aileron assembly means tab member to said control input means for actuation and connecting said spoiler assembly means to said aileron assembly means aileron surface member for actuation without the application of forces from said control input means, said aileron assembly means aileron surface member powering said spoiler assembly means during in-flight actuation without thereby introducing reaction aerodynamic loading forces into said control input means.

2. The invention defined by claim 1, wherein said spoiler assembly means consists of ganged plate members positioned transverse to and rotatable about the aircraft longitudinal axis when actuated, said spoiler assembly means plate members introducing reaction aerodynamic loading forces into the aircraft wing during flight and in by-pass relation to said aileron assembly means tab member and said control input means.

References Cited
UNITED STATES PATENTS 3,318,555  5/1967  Swogger et al. _____ 244—90

ANDREW H. FARRELL, *Primary Examiner.*